United States Patent
Yokoyama et al.

(10) Patent No.: US 12,485,788 B2
(45) Date of Patent: Dec. 2, 2025

(54) POWER STORAGE AMOUNT CONTROL DEVICE AND POWER STORAGE AMOUNT CONTROL METHOD WITH CONTROL BASED ON POWER SUPPLY AREA

(71) Applicant: TOYOTA JIDOSHA KABUSHIKI KAISHA, Toyota (JP)

(72) Inventors: Daiki Yokoyama, Gotemba (JP); Tomoyuki Kubota, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 605 days.

(21) Appl. No.: 18/045,918

(22) Filed: Oct. 12, 2022

(65) Prior Publication Data
US 2023/0202333 A1 Jun. 29, 2023

(30) Foreign Application Priority Data

Dec. 28, 2021 (JP) .................. 2021-215244

(51) Int. Cl.
*B60L 53/64* (2019.01)
*B60L 53/62* (2019.01)
*B60L 53/63* (2019.01)

(52) U.S. Cl.
CPC .............. *B60L 53/64* (2019.02); *B60L 53/62* (2019.02); *B60L 53/63* (2019.02)

(58) Field of Classification Search
CPC .......... B60L 53/64; B60L 53/62; B60L 53/63; B60L 53/39; B60L 53/68; B60L 55/00; B60L 58/13; B60L 53/12; B60L 53/53; B60R 16/033
See application file for complete search history.

(56) References Cited

U.S. PATENT DOCUMENTS

| | | | |
|---|---|---|---|
| 2012/0306446 A1 | 12/2012 | Suganuma et al. | |
| 2013/0300374 A1 | 11/2013 | Tomita et al. | |
| 2017/0141368 A1* | 5/2017 | Ricci | ................. B60L 53/52 |

FOREIGN PATENT DOCUMENTS

| | | |
|---|---|---|
| JP | 2010-193657 A | 9/2010 |
| JP | 2013-106372 A | 5/2013 |
| JP | 2014-066713 A | 4/2014 |

(Continued)

OTHER PUBLICATIONS

Machine translation of JP-2017143632-A (Year: 2025).*

*Primary Examiner* — David V Henze-Gongola
(74) *Attorney, Agent, or Firm* — Finnegan, Henderson, Farabow, Garrett and Dunner, LLP

(57) ABSTRACT

A power storage amount control device includes a processor configured to acquire a value of a parameter representing a predicted power consumption amount of a load, set target power storage amounts of a plurality of power storage devices based on the value of the parameter representing the predicted power consumption amount, transmit a signal to the power storage device such that the power storage amount of the power storage device is equal to or larger than the set target power storage amount, and set the target power storage amount of a first power storage device supplying the power to a first load higher than the target power storage amount of a second power storage device supplying the power to a second load of which the predicted power consumption amount is smaller than that of the first load.

7 Claims, 8 Drawing Sheets

(56) References Cited

FOREIGN PATENT DOCUMENTS

| JP | 2014-143883 A |   | 8/2014 |
|----|---------------|---|--------|
| JP | 2017143632 A  | * | 8/2017 |
| JP | 2019-080369 A |   | 5/2019 |

* cited by examiner

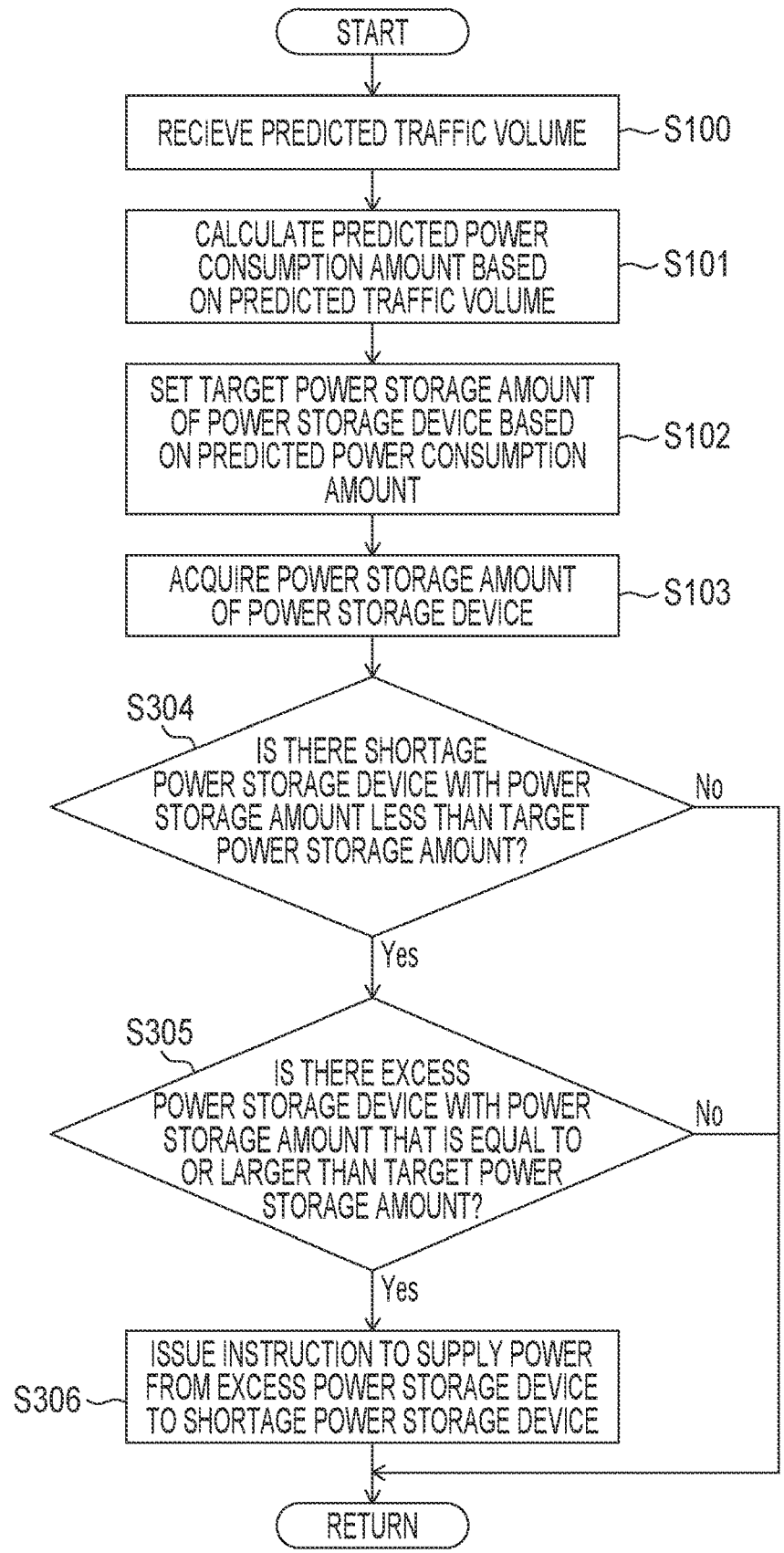

POWER STORAGE AMOUNT CONTROL DEVICE AND POWER STORAGE AMOUNT CONTROL METHOD WITH CONTROL BASED ON POWER SUPPLY AREA

CROSS-REFERENCE TO RELATED APPLICATION

This application claims priority to Japanese Patent Application No. 20:21-215244 filed on Dec. 28, 2021, incorporated herein by reference in its entirety.

BACKGROUND

1. Technical Field

The present disclosure relates to a power storage amount control device and a power storage amount control method.

2. Description of Related Art

In recent years, a power system is known in which power is supplied to a load from a power storage device that stores the power (Japanese Unexamined Patent Application Publication No. 2010-193657 (JP 2010-193657 A), Japanese Unexamined Patent Application Publication No. 2013-106372 (JP 2013-106372 A), and Japanese Unexamined Patent Application Publication No. 2019-080369 (JP 2019-080369 A)). For example, in JP 2010-193657 A, a mobile vehicle power supply system is disclosed in which power is supplied to a battery electrical vehicle (BEV) or a plug-in hybrid electric vehicle (PHEV) that can be charged externally (referred to as "electrified vehicle" including these vehicles). In the mobile vehicle power supply system, specifically, when non-contact power supply while traveling is performed from a power transmission device in a power supply area, power is supplied to the power transmission device from a power storage device that is provided in the power supply area and stores the power from a system power source. According to the description of JP 2010-193657 A, in the mobile vehicle power supply system, the power is supplied to the load via the power storage device instead of direct power supply to the load from the system power source. Thus, stable power supply is possible even when the load is used for a short time.

SUMMARY

By the way, when the power storage device is provided for each power supply area as described in JP 2010-193657 A, each power storage device is considered to have a uniform power storage amount. However, a frequency of use of the load and a power consumption depending on the load differ for each power supply area or for each load (for example, power transmission device) to which the power storage device supplies the power. Accordingly, power shortage and underutilization of power may occur depending on the power supply area.

Aspects of the present disclosure provide a power storage amount control device and a power storage amount control method that suppress power shortage or underutilization of power.

A power storage amount control device according to a first aspect of the present disclosure is configured to control a power storage amount of each of a plurality of power storage devices. Each of the power storage devices is configured to store power from a system power source and to supply the stored power to a corresponding load. The power storage amount control device includes a processor configured to: acquire a value of a parameter representing a predicted power consumption amount of the load; set a target power storage amount of each of the power storage devices based on the value of the parameter representing the predicted power consumption amount; transmit signals to the power storage devices such that the power storage amount of each of the power storage devices is equal to or larger than the set target power storage amount; and set the target power storage amount of a first power storage device that supplies the power to a first load higher than the target power storage amount of a second power storage device that supplies the power to a second load of which the predicted power consumption amount represented by the parameter that is smaller than the predicted power consumption amount of the first load, the first power storage device and the second power storage device being included in the power storage devices.

A power storage amount control method according to a second aspect of the present disclosure is a method for controlling a power storage amount of each of a plurality of power storage devices. Each of the power storage devices being configured to store power from a system power source and to supply the stored power to a corresponding load. The power storage amount control method includes: acquiring a value of a parameter representing a predicted power consumption amount of the load; setting a target power storage amount of each of the power storage devices such that the target power storage amount of a first power storage device that supplies the power to a first load higher than the target power storage amount of a second power storage device that supplies the power to a second load of which the predicted power consumption amount represented by the parameter that is smaller than the predicted power consumption amount of the first load, the first power storage device and the second power storage device being included in the power storage devices; and transmitting signals to the power storage devices such that the power storage amount of each of the power storage devices is equal to or larger than the target power storage amount.

According to the aspect of the present disclosure, it is possible to suppress the power shortage or the underutilization of power.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart showing a flow of power storage amount control processing in the non-contact power supply system of the third embodiment.

DETAILED DESCRIPTION OF EMBODIMENTS

Hereinafter, embodiments will be described in detail with reference to drawings. In the following description, the same reference number is assigned to a similar component.

First Embodiment

Figure 1:
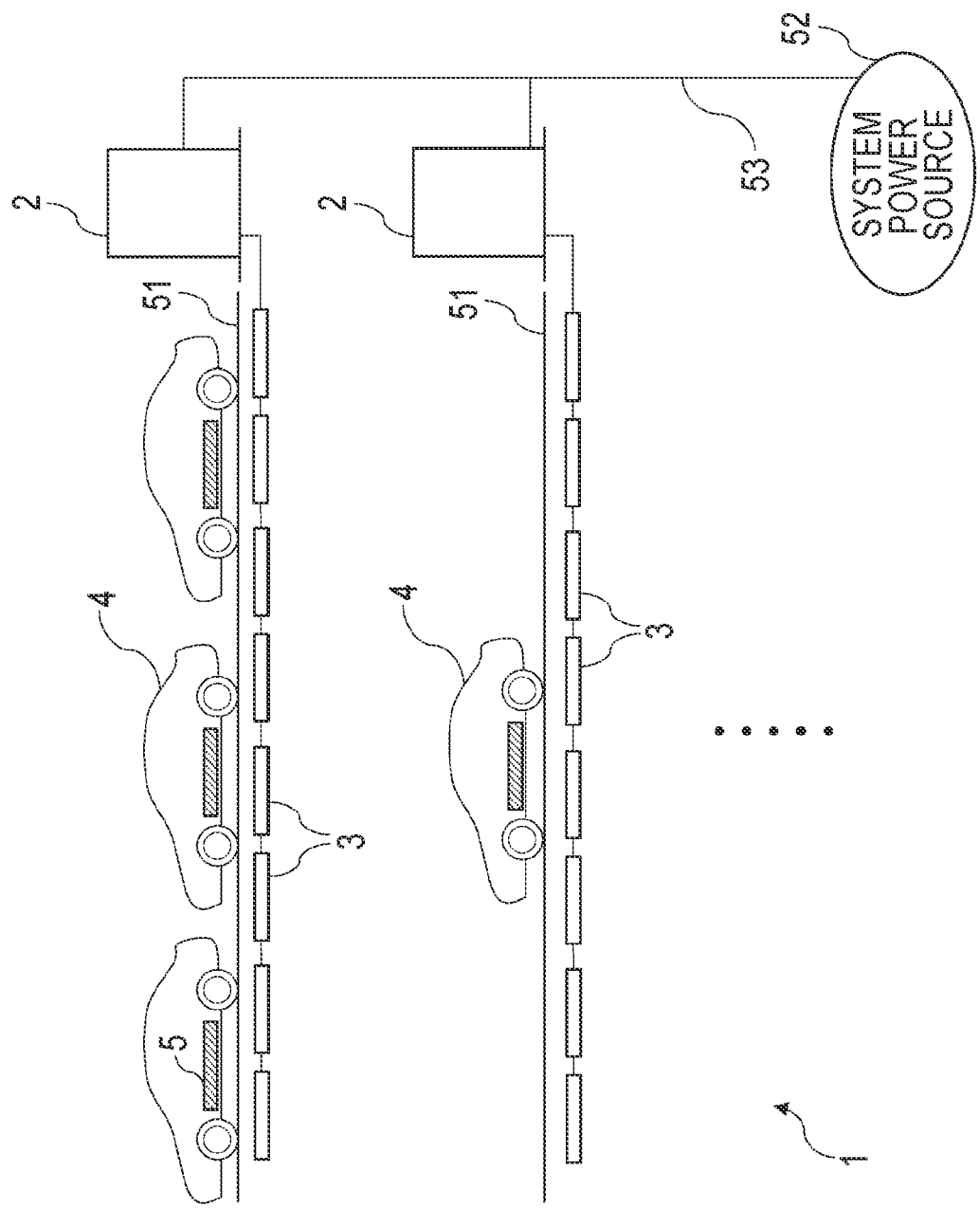
FIG. 1 is a diagram schematically showing a configuration of a non-contact power supply system of a first embodiment.

FIG. 1 is a diagram schematically showing a configuration of a non-contact power supply system 1 of a first embodiment. The non-contact power supply system 1 includes a system power source 52, a plurality of power storage devices 2, a plurality of power transmission devices 3, and an electrified vehicle 4 traveling on a road 51, and performs non-contact power transmission by magnetic field resonant coupling (magnetic field resonance) from the power transmission device 3 to the electrified vehicle 4. In particular, the non-contact power supply system 1 in the present embodiment performs the non-contact power transmission from the power transmission device 3 to the electrified vehicle 4 while the electrified vehicle 4 is traveling. Therefore, the power transmission device 3 transmits the power to the electrified vehicle 4 in a non-contact manner when a vehicle is located on the road 51 for traveling (that is, while the vehicle is actually traveling or while the vehicle is stopped on the road 51 due to a signal light or the like). Then, the electrified vehicle 4 receives the power from the power transmission device 3 in a non-contact manner when the electrified vehicle 4 is located on the road 51 for traveling.

The system power source 52 supplies commercial power owned by a power company to each power supply area. The system power source 52 is connected to the power storage devices 2 in a corresponding power supply area by using a power line 53. The power line 53 is an electric wiring for transmitting the power from the system power source 52 to the power storage device 2.

The power storage device 2 stores the power from the system power source 52 and supplies the power to corresponding power transmission devices 3. The power storage device 2 in the present embodiment is connected to the power transmission devices 3 disposed in a predetermined section of the road 51. Therefore, one power storage device 2 is disposed for each predetermined section of the road 51.

The power transmission device 3 enables the supply power to the electrified vehicle 4 located on the power transmission device 3 in a non-contact manner. As shown in FIG. 1, the power transmission devices 3 are continuously embedded in the road 51 (underground) on which the electrified vehicle 4 travels, for example, in the center of a lane in which the vehicle travels. In the present embodiment, each power transmission device 3 is connected to one power storage device 2, and the power transmission devices 3 continuously disposed in the predetermined section of the road 51 are connected to one power storage device 2. The illustrated power transmission devices 3 are connected in series to the power storage device 2, but may be connected in parallel. Further, the power transmission device 3 controls the power transmission to a power receiving device 5 of the electrified vehicle 4 by a control signal from the electrified vehicle 4.

The electrified vehicle 4 includes the power receiving device 5 (not shown) that receives the power from the power transmission device 3 in a non-contact manner when the vehicle is located on the power transmission device 3. The power receiving device 5 includes a coil that receives the power from a coil of the power transmission device 3 by the magnetic field resonant coupling. Then, the electrified vehicle 4 stores the received power in a battery (not shown) of the vehicle and is driven by an electric motor using the stored power.

Figure 2:
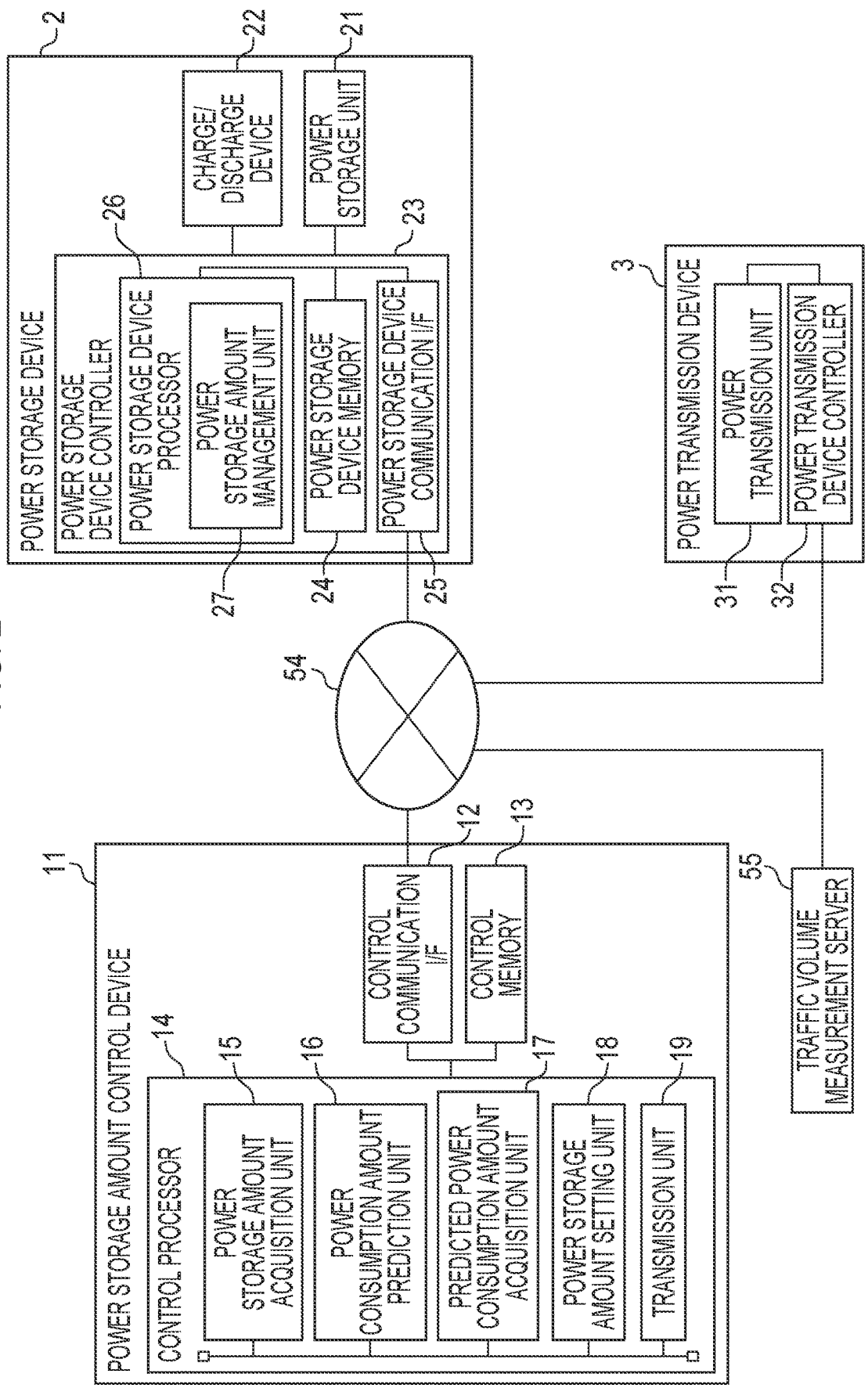
FIG. 2 is a block diagram showing each element in the non-contact power supply system of the first embodiment.

FIG. 2 is a block diagram showing each element in the non-contact power supply system 1 of the present embodiment. As shown in FIG. 2, the power storage device 2 and the power transmission device 3 are connected to a power storage amount control device 11 and a traffic volume measurement server 55 via a network 54. Therefore, the power storage device 2, the power transmission device 3, the power storage amount control device 11, and the traffic, volume measurement server 55 communicate with each other via the network 54.

The power storage device 2 includes a power storage unit 21, a charge/discharge device 22, and a power storage device controller 23. The power storage unit 21 and the charge/discharge device 22 are connected to the power storage device controller 23 and are controlled by the power storage device controller 23.

The power storage unit 21 is a secondary battery that is provided in the power storage device 2 and stores the power supplied from the system power source 52. The power storage unit 21 is composed of, for example, a lithium ion battery, or a nickel hydrogen battery. The power storage unit 21 has a power storage amount detection sensor (not shown) that detects a power storage amount of the power storage unit 21. The power storage amount detection sensor is connected to the power storage device controller 23, and an output thereof is input to the power storage device controller 23.

The charge/discharge device 22 controls charging to the power storage unit 21 and discharging from the power storage device 2. The charge/discharge device 22 turns on/off the connection between the power storage unit 21 and the system power source 52 and the connection between the power storage unit 21 and the power transmission device 3. Further, in the present embodiment, the charge/discharge device 22 converts alternating-current power supplied from an external device (system power source 52) into direct-current power and supplies the converted power to the power storage unit 21, and converts direct-current power supplied from the power storage unit 21 into alternating-current power and supplies the converted power to an external device (power transmission device 3). The charge/discharge device 22 includes switches that turn on/off the connection between the power storage device 2 and the system power source 52 and the connection between the power storage device 2 and the power transmission device 3, and AC/DC converters that are provided between the system power source 52 and an interface unit and between the power transmission device 3 and the interface unit. When the power is stored from the system power source 52 to the power storage unit 21, the AC/DC converter converts the alternating-current power from the system power source 52 into the direct-current power. When the power is discharged from the power storage unit 21 to the power transmission device 3, the AC/DC converter converts the direct-current power from the power storage unit 21 into the alternating-current power.

The power storage device controller 23 includes a power storage device memory 24, a power storage device communication interface (hereinafter referred to as "power storage device communication I/F") 25, and a power storage device processor 26. The power storage device controller 23, the power storage unit 21, and the charge/discharge device 22 are connected to each other via a signal line.

Examples of the power storage device memory 24 include a volatile semiconductor memory (such as RAM) and a non-volatile semiconductor memory (such as ROM). The power storage device memory 24 stores a computer program for executing various pieces of processing in the power storage device processor 26, various pieces of data used when the various pieces of processing are executed by the power storage device processor 26, and the like.

The power storage device communication I/F 25 has an interface circuit that connects the power storage device 2 to the network 54, The power storage device 2 communicates with the power storage amount control device 11 and the power transmission device 3 via the power storage device communication I/F 25.

The power storage device processor 26 has one or a plurality of central processing units (CPUs) and peripheral circuits thereof, and executes various pieces of processing based on the computer program stored in the power storage device memory 24. The power storage device processor 26 includes a power storage amount management unit 27 as a functional module realized by the computer program operating on the power storage device processor 26. The power storage amount management unit 27 in the power storage device processor 26 manages the power storage device 2 such that a power storage amount of the power storage device 2 becomes a target power storage amount set by a power storage amount setting unit 18 of the power storage amount control device 11 described below. The power storage amount management unit 27 specifically receives the target power storage amount via the power storage device communication I/F 25 and controls the power storage device 2 such that the power storage amount of the power storage device 2 becomes the target power storage amount. Specifically, the power storage amount management unit 27, for example, turns off the switch of the charge/discharge device 22 when the power storage amount detected by the power storage amount detection sensor of the power storage unit 21 reaches the target power storage amount and turns on the switch of the charge/discharge device 22 when the power storage amount does not reach the target power storage amount.

The power transmission device 3 includes a power transmission unit 31 and a power transmission device controller 32. The power transmission device controller 32 may be embedded in the road 51 or may be disposed in a place (including the ground) different from the inside of the road 51. The power transmission unit 31 and the power transmission device controller 32 are connected to each other via a signal line. The power transmission device 3 in the present embodiment transmits the power to the electrified vehicle 4 by the power supplied from the power storage unit 21 of the power storage device 2, but may transmit the power by using at least a part of the power of the power storage unit 21, for example, may transmit the power by using the power of the power storage unit 21 and the power from the system power source 52. In this case, the power transmission device 3 is connected to the system power source 52 via the power storage device 2 and is connected to the system power source 52 even without via the power storage device 2.

The power transmission unit 31 transmits the power supplied from the power storage unit 21 of the power storage device 2 to the electrified vehicle 4. The power transmission device 3 has a power transmission side rectifier circuit, an inverter, and a power transmission side resonant circuit including a coil (not shown). The power transmission device 3 may be configured to be able to receive the power from the electrified vehicle 4. In this case, the power transmission device 3 has a device or a circuit that supplies the received power to the power storage device 2, as in the power receiving device 5 of the electrified vehicle 4. Further, in this case, the power transmission device 3 may use a resonator composed of the power transmission side resonant circuit to receive the power from the electrified vehicle 4.

The power transmission device controller 32 controls the supply of the power to the power transmission unit 31. The power transmission device controller 32 controls, for example, a supply timing and supply amount of the power to the power transmission unit 31. The power transmission device controller 32 has a communication interface for connecting the power transmission device 3 to the network 54. The power transmission device 3 communicates with the power storage device 2 via the power transmission device controller 32.

The power storage amount control device 11 includes a control communication interface (hereinafter referred to as "control communication I/F") 12, a control memory 13, and a control processor 14 to control the power storage amount of the power storage devices 2 that supply the power to the power transmission device 3. The control communication I/F 12, the control memory 13, and the control processor 14 are connected to each other via a signal line.

The control communication I/F 12 has an interface circuit that connects the power storage amount control device 11 to the network 54. The power storage amount control device 11 communicates with the power storage device 2, the power transmission device 3, and the traffic volume measurement server 55 via the control communication I/F 12.

The control memory 13 has, for example, a volatile semiconductor memory and a non-volatile semiconductor memory, as in the power storage device memory 24. The control memory 13 stores a computer program for executing various pieces of processing in the control processor 14, various pieces of data used when the various pieces of processing are executed by the control processor 14, and the like.

The control processor 14 has one or a plurality of CPUs and peripheral circuits thereof, as in the power storage device processor 26. The control processor 14 may further include a calculation circuit, such as a logical calculation unit or a numerical calculation unit. The control processor 14 executes the various pieces of processing based on the computer program stored in the control memory 13. In particular, the control processor 14 controls the power storage amount of the power storage devices 2 connected via the network 54.

When one power storage device 2 is provided for each of the power transmission devices 3 capable of supplying the power while traveling as shown in FIGS. 1, 2, the target power storage amount of each power storage device 2 is considered to be set to a uniform power storage amount. However, a frequency of the power supply and a charge amount while the electrified vehicle 4 is traveling are different for each section of the road 51. Therefore, a frequency of use of the power transmission device 3 and a power consumption by the power transmission device 3 differ for each section of the road 51 and for each power transmission device 3 to which the power storage device 2 supplies the power. As a result, when the target power storage amount of each power storage device 2 is made uniform, there is a possibility that a power shortage may occur in a section of the road 51 having a large power consumption amount, while there is a possibility that the stored power may not be appropriately used in a section of the road 51 having a small power consumption amount.

Thus, in the present embodiment, the control processor 14 of the power storage amount control device 11 sets the target power storage amount of the power storage device 2 that supplies the power to the power transmission device 3 having a relatively large predicted power consumption amount higher than the power storage device 2 having a relatively small predicted power consumption amount.

The control processor 14 has one or a plurality of CPUs and peripheral circuits thereof, as in the power storage device processor 26. The control processor 14 may further include a calculation circuit, such as a logical calculation unit or a numerical calculation unit. The control processor 14 executes the various pieces of processing based on the computer program stored in the control memory 13. As shown in FIG. 2, the control processor 14 includes a power storage amount acquisition unit 15, a power consumption amount prediction unit 16, a predicted power consumption amount acquisition unit 17, a power storage amount setting unit 18, and a transmission unit 19 as functional modules realized by the computer program operating on the power storage device processor 26.

The power storage amount acquisition unit 15 acquires the power storage amount (state of charge: SOC) of each power storage device 2. In the present embodiment, the power storage amount acquisition unit 15 acquires the power storage amount from the power storage device controller 23 of each power storage device 2 via the control communication I/F 12.

The power consumption amount prediction unit 16 predicts the predicted power consumption amount of each power transmission device 3. For example, the power consumption amount prediction unit predicts the power transmitted from the power transmission device 3 to the electrified vehicle 4 in each section of the road 51 in a predetermined period based on a predicted traffic volume from the traffic volume measurement server 55 described below, as the predicted power consumption amount of each power transmission device 3. In the present embodiment, the predicted power consumption amount is calculated to be a larger value as the predicted traffic volume is larger. In the example of FIG. 1, the power transmission device 3 that is provided in an upper road section where the predicted traffic volume is large is calculated to have a larger predicted power consumption amount than the power transmission device 3 that is provided in a lower road section where the predicted traffic volume is small. In the present embodiment, the predicted power consumption amount is an example of "value of parameter representing predicted power consumption amount".

The predicted power consumption amount acquisition unit 17 acquires a value of a parameter representing the predicted power consumption amount of the power transmission device 3 that is provided in each section of the road 51. In the present embodiment, the predicted power consumption amount, which is predicted by the power consumption amount prediction unit 16, in the power transmission device 3 in each section of the road 51 is acquired.

The power storage amount setting unit 18 sets the target power storage amount of the power storage device 2 based on the value of the parameter representing the predicted power consumption amount. In the present embodiment, the power storage amount setting unit 18 sets the target power storage amount of the power storage device 2 connected to the power transmission device 3 in each section of the road 51 based on the predicted power consumption amount, which is acquired by the predicted power consumption amount acquisition unit 17, in the power transmission device 3 in that section. In particular, in the present embodiment, the power storage amount setting unit 18 sets the target power storage amount of the power storage device 2 that supplies the power to the power transmission device 3 having a relatively large predicted power consumption amount higher than the target power storage amount of the power storage device 2 that supplies the power to the power transmission device 3 having a relatively small predicted power consumption amount. In the example of FIG. 1, the power storage device 2 that supplies the power to the power transmission device 3 having a large predicted power consumption amount is set to have a larger target power storage amount than the power storage device 2 that supplies the power to the power transmission device 3 having a small predicted power consumption amount. In particular, in the present embodiment, the target power storage amount is set higher as the predicted power consumption amount is larger. In this case, the target power storage amount may be set to increase in proportion to an increase in the predicted power consumption amount. Further, the target power storage amount may be continuously increased or gradually increased according to the increase in the predicted power consumption amount.

The transmission unit 19 transmits a signal to each power storage device 2 such that the power storage amount of each power storage device 2 becomes the target power storage amount set by the power storage amount setting unit 18. The transmission unit 19 causes the control communication I/F 12 to transmit the signal to each power storage device 2. In particular, in the present embodiment, determination is made whether or not the power storage amount of each power storage device 2 is less than the target power storage amount, and when the power storage amount thereof is determined to be less than the target power storage amount, the control signal is transmitted to the power storage device 2 such that the power storage amount in the power storage device 2 increases.

The traffic volume measurement server 55 measures the traffic volume of vehicles including the electrified vehicle 4 on each road 51. The traffic volume measurement server 55 receives, for example, position information including a current location and advancing direction of the vehicle detected by a global positioning system (GPS) of each vehicle from each vehicle. Then, the traffic volume measurement server 55 measures a current traffic volume for each section of the road 51 based on the position information received from each vehicle and calculates a predicted traffic volume for each section of the road 51 based on a measurement result. In the example shown in FIG. 1, since the current traffic volume of the road 51 described on the upper side is higher than that of the road 51 described on the lower side, the predicted traffic volume of the road 51 on the upper side is predicted to be higher than that of the road 51 on the lower side. The predicted traffic volume may be calculated by any other method. Therefore, for example, the predicted traffic volume may be calculated based on the traffic volume at the same period, on the same day, and in the same time zone in the past.

Figure 3:
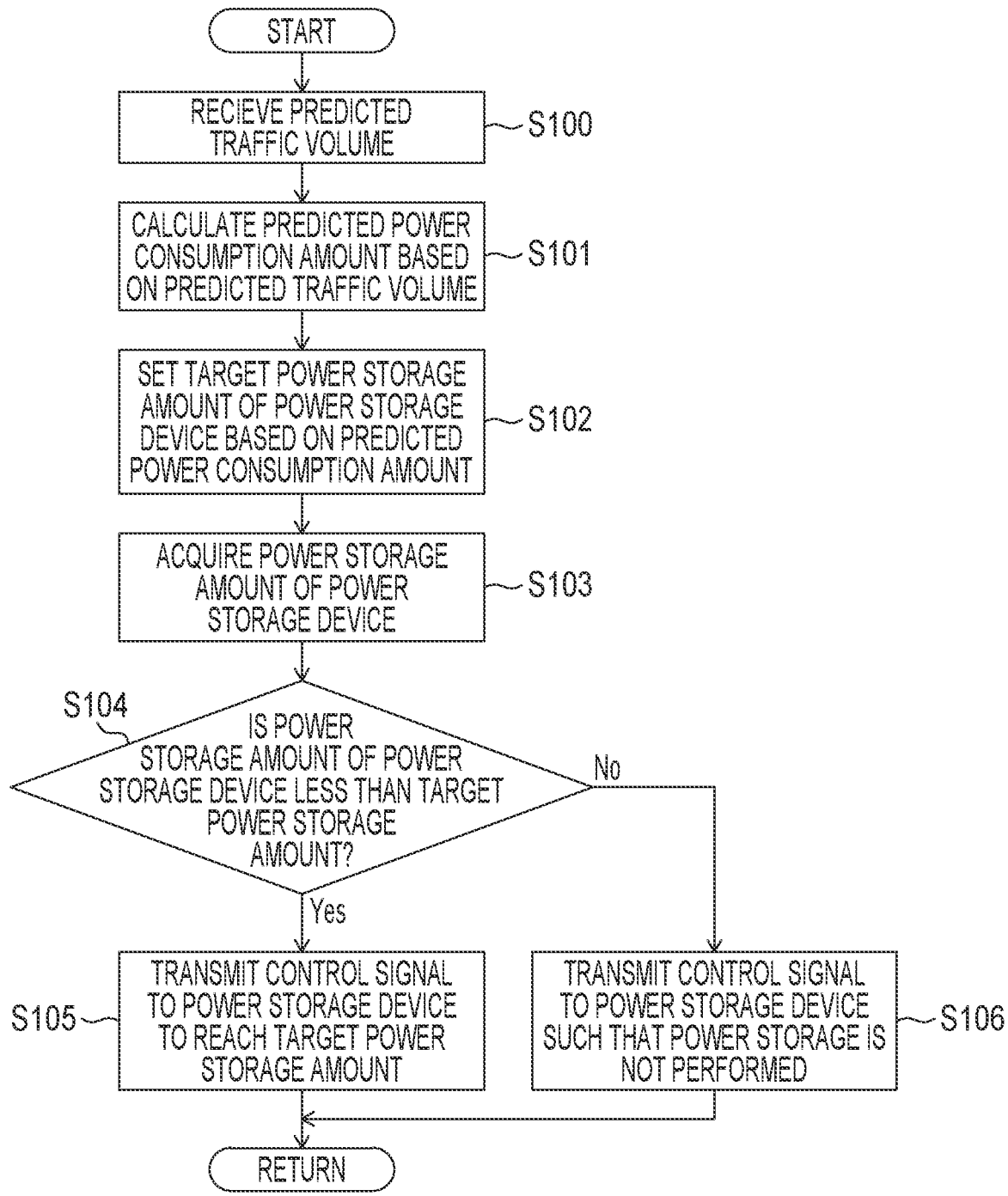
FIG. 3 is a flowchart showing a flow of power storage amount control processing in the non-contact power supply system of the first embodiment.

Next, an operation of power storage amount control processing in the non-contact power supply system 1 of the present embodiment will be described in detail with reference to a flowchart of FIG. 3. The power storage amount control processing is executed by the control processor 14 of the power storage amount control device 11. FIG. 3 is a flowchart showing a flow of the power storage amount control processing in the non-contact power supply system 1 of the present embodiment.

First, the control processor 14 receives the predicted traffic volume from the traffic volume measurement server 55 (step S100). The power consumption amount prediction unit 16 specifically receives the predicted traffic volume for each section of each road 51 via the control communication I/F 12.

Next, the control processor 14 calculates the predicted power consumption amount of the power transmission device 3 that is provided in each section of the road 51 based on the predicted traffic volume received in step S100 (step S101). The power consumption amount prediction unit 16 specifically calculates the predicted power consumption amount of the power transmission device 3 that is provided in each section of the road 51 based on the predicted traffic volume in that section.

Next, the control processor 14 sets the target power storage amount of each power storage device 2 based on the predicted power consumption amount calculated in step S101 (step S102). The power storage amount setting unit 18 specifically sets the target power storage amount of the power storage device 2 connected to the power transmission device 3 based on the predicted power consumption amount, which is calculated by the power consumption amount prediction unit 16 and acquired by the predicted power consumption amount acquisition unit 17, of the power transmission device 3 in each section of the road 51. In the present embodiment, the power storage amount setting unit 18 sets the target power storage amount to be higher as for the power storage device 2 that supplies the power to the power transmission device 3 having a large predicted power consumption amount, and sets the target power storage amount to be lower according to the predicted power consumption amount in order from the highest target power storage amount 100%.

Next, the control processor 14 acquires the power storage amount of each power storage device 2 (step S103). The power storage amount acquisition unit 15 of the control processor 14 specifically acquires the current power storage amount from each power storage device 2 via the control communication I/F 12.

Next, the control processor 14 determines whether the power storage amount of each power storage device 2 acquired in step S103 is less than the target power storage amount of the power storage device 2 (step S104). The transmission unit 19 specifically determines whether the current power storage amount of each power storage device 2 is less than the target power storage amount.

When the power storage amount of each power storage device 2 is determined to be less than the target power storage amount of the power storage device 2 (Yes in step S104), the transmission unit 19 transmits the control signal to the power storage device 2 such that the power storage amount thereof becomes the target power storage amount (step S105). The transmission unit 19 specifically transmits the control signal to the power storage device communication I/F 25 of each power storage device 2 via the control communication I/F 12 such that the power storage amount thereof becomes the target power storage amount.

On the other hand, then the power storage amount of each power storage device 2 is determined to be equal to or larger than the target power storage amount of the power storage device 2 (No in step S104), the transmission unit 19 transmits the control signal to the power storage device 2 such that the power storage is not performed on the power storage device 2 (step S106).

When the power storage amount control processing is executed, the charge/discharge device 22 of the power storage device 2 controls charging to the power storage unit 21 according to the control signal from the transmission unit 19 of the power storage amount control device 11. As a result, the charge/discharge device 22 is controlled such that the power storage amount of the power storage unit 21 is equal to or larger than the target power storage amount.

Thus, according to the present embodiment, the target power storage amount of the power storage device 2 that supplies the power to the power transmission device 3 having a large predicted power consumption amount can be set to be higher than that of the power storage device 2 that supplies the power to the power transmission device 3 having a small predicted power consumption amount. Accordingly, the power storage device 2 that supplies the power to the power transmission device 3 having a large predicted power consumption amount has a high power storage amount, and a large amount of power can be supplied to the power transmission device 3. On the contrary, the power storage device 2 that supplies the power to the power transmission device 3 having a small predicted power consumption amount has a low power storage amount, and wasteful power storage is suppressed. Accordingly, it is possible to suppress the power shortage and the underutilization of power for each section of the road 51.

Second Embodiment

Next, the non-contact power supply system 1 according to a second embodiment of the present disclosure will be described with reference to FIGS. 4 and 5. A basic configuration of the non-contact power supply system 1 according to the second embodiment is the same as that of the first embodiment. A difference in configuration is that the control processor 14 of the power storage amount control device 11 further includes a surplus power acquisition unit 61 that acquires information on surplus power in a power supply jurisdiction area. Then, in the present embodiment, the transmission unit 19 transmits the control signal to the power storage device 2 solely when there is surplus power.

Figure 4:
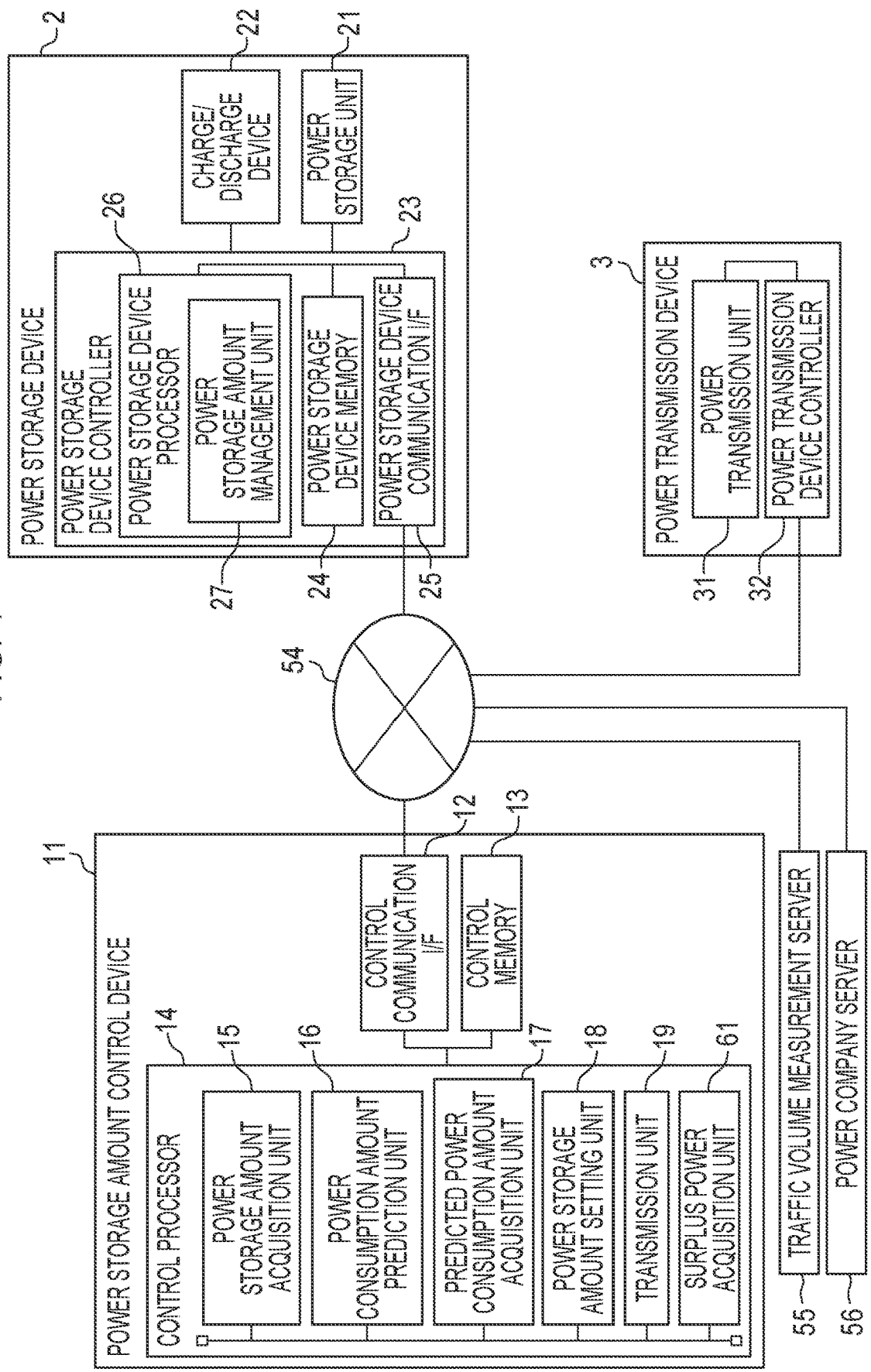
FIG. 4 is a block diagram showing each element in a non-contact power supply system of a second embodiment.

FIG. 4 is a block diagram showing each element in the non-contact power supply system 1 of the present embodiment.

As described above, the control processor 14 of the power storage amount control device 11 further includes the surplus power acquisition unit 61 as a functional module. The surplus power referred to here is power supplied in excess of the power consumption amount of the power supply jurisdiction area managed by a power company. The surplus power specifically refers to power that is surplus without being consumed of power generated by solar power generation in which power generation amount cannot be adjusted. In addition, the surplus power may be renewable energy, such as wind power, hydraulic power, and biomass, produced without emitting greenhouse gases or power generated by a power plant. The surplus power acquisition unit 61 acquires, from a power company server 56 via the control communication I/F 12, information on the surplus power including the magnitude of the surplus power in the power supply jurisdiction area where the power storage device controlled by the power storage amount control device 11 is installed.

Next, an operation of the power storage amount control processing in the non-contact power supply system 1 of the present embodiment will be described in detail with reference to a flowchart of FIG. 5.

Figure 5:
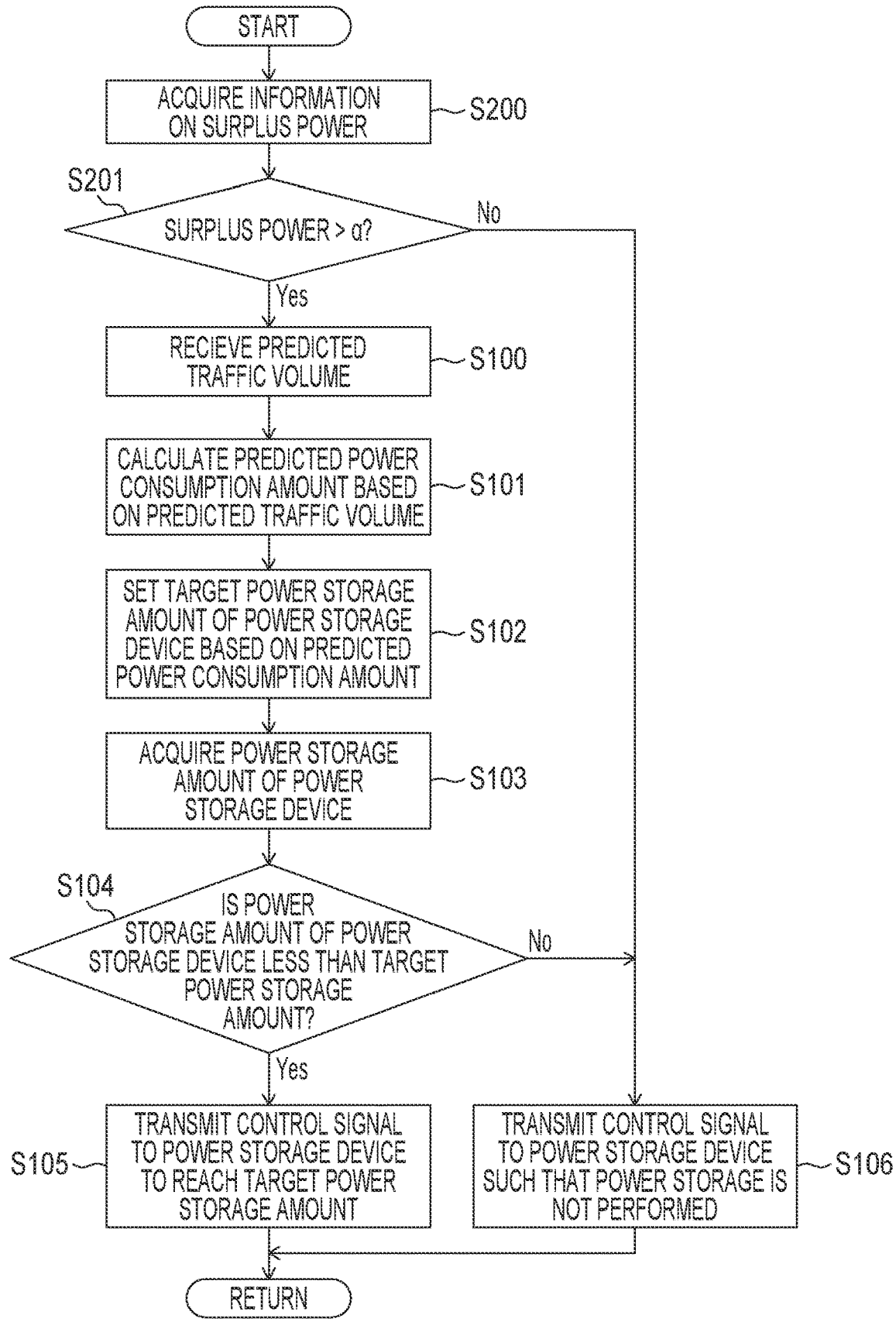
FIG. 5 is a flowchart showing a flow of power storage amount control processing in the non-contact power supply system of the second embodiment.

FIG. 5 is a flowchart showing a flow of the power storage amount control processing in the non-contact power supply system 1 of the present embodiment. First, the control processor 14 acquires the information on the surplus power from the power company server 56 (step S200). The surplus power acquisition unit 61 specifically receives, via the control communication I/F 12, the power supplied in excess of the power consumption amount in the area where the power storage device 2 and the power transmission device 3 are installed.

Next, based on the information on the received surplus power, the control processor 14 determines whether or not the magnitude of the surplus power is larger than a threshold value α (step S201). The threshold value α in the present embodiment is 0, and the surplus power acquisition unit 61 determines whether or not the magnitude of the surplus power is larger than the threshold value α. The threshold value α may be a numerical value for determining whether the surplus power is generated. For example, the threshold value α may be predetermined power that is larger than zero and is expected to be stored in the power storage device 2.

When the magnitude of the surplus power is determined to be larger than the threshold value α (Yes in step S201), the same processing as in the first embodiment shown in FIG. 3 (steps S100 to S106) is performed. Since the steps after step S100 have the same flow as that of the first embodiment, the description thereof will be omitted. On the other hand, when the magnitude of the surplus power is determined to be equal to or less than the threshold value α (No in step S201), the transmission unit 19 transmits the control signal not to perform the power storage (step S106).

Thus, in the present embodiment, when the magnitude of the surplus power in the power supply jurisdiction area where the power storage device 2 is installed is equal to or less than the threshold value α, the control signal is transmitted to the power storage device such that the power storage is not performed on the power storage device 2 even when the power storage amount of the power storage device 2 is smaller than the target power storage amount. Therefore, in the present embodiment, the power supply and the power storage are performed on the power storage device 2 solely when the surplus power is generated. Accordingly, the power storage for the power storage device 2 with the power storage amount that is not reached the target power storage amount can be performed by using the surplus power, and thus the power can be effectively used.

Third Embodiment

Next, the non-contact power supply system 1 according to a third embodiment of the present disclosure will be described with reference to FIGS. 6 and 7. In the non-contact power supply system 1 according to the third embodiment, the basic configuration and control are the same as the basic configuration and control of the first embodiment and the second embodiment. A difference from the first and second embodiments in the present embodiment is that a second power line 57 that can exchange the power of each power storage device 2 without via the system power source 52 is provided, and the control processor 14 of the power storage amount control device 11 further includes a specification unit 71 that specifies a shortage power storage device with the power storage amount that is less than the target power storage amount and an excess power storage device with the power storage amount that is higher than the target power storage amount. Then, in the present embodiment, the transmission unit 19 of the power storage amount control device 11 transmits the control signal for supplying the power without via the system power source 52 from the excess power storage device with the power storage amount that is higher than the target power consumption amount to the shortage power storage device with the power storage amount that is lower than the target power consumption amount.

Figure 6:
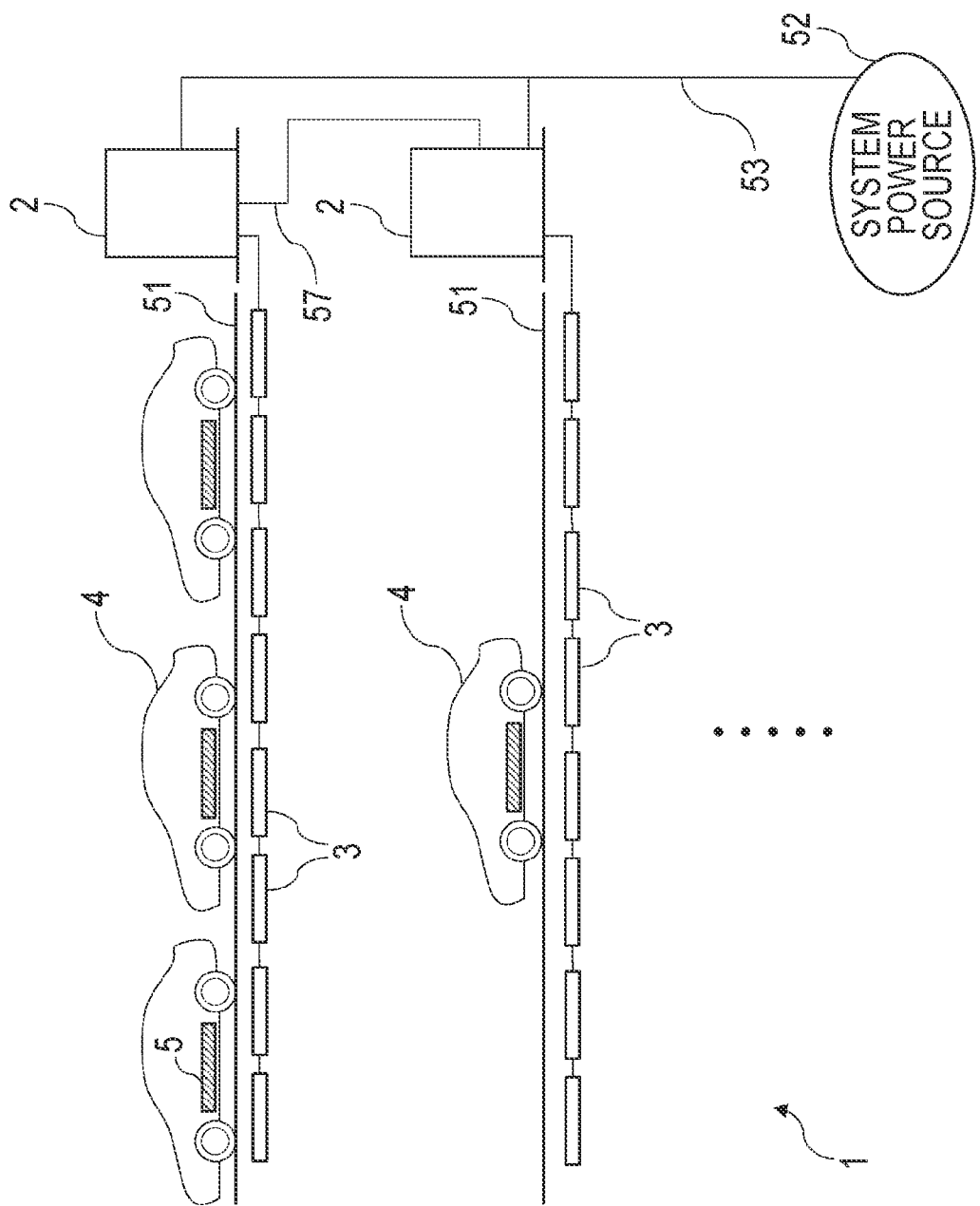
FIG. 6 is a diagram schematically showing a configuration of a non-contact power supply system of a third embodiment.

FIG. 6 is a diagram schematically showing a configuration of the non-contact power supply system 1 of the third embodiment. As can be seen from FIG. 6, in the present embodiment, the second power line 57 is provided in addition to the power line 53 (hereinafter referred to as "first power line") connecting the system power source 52 and the power storage device 2. The second power line 57 is a power line that enables the power of each power storage device 2 to exchange without via the system power source 52 and is provided as a power line different from the first power line 53.

Figure 7:
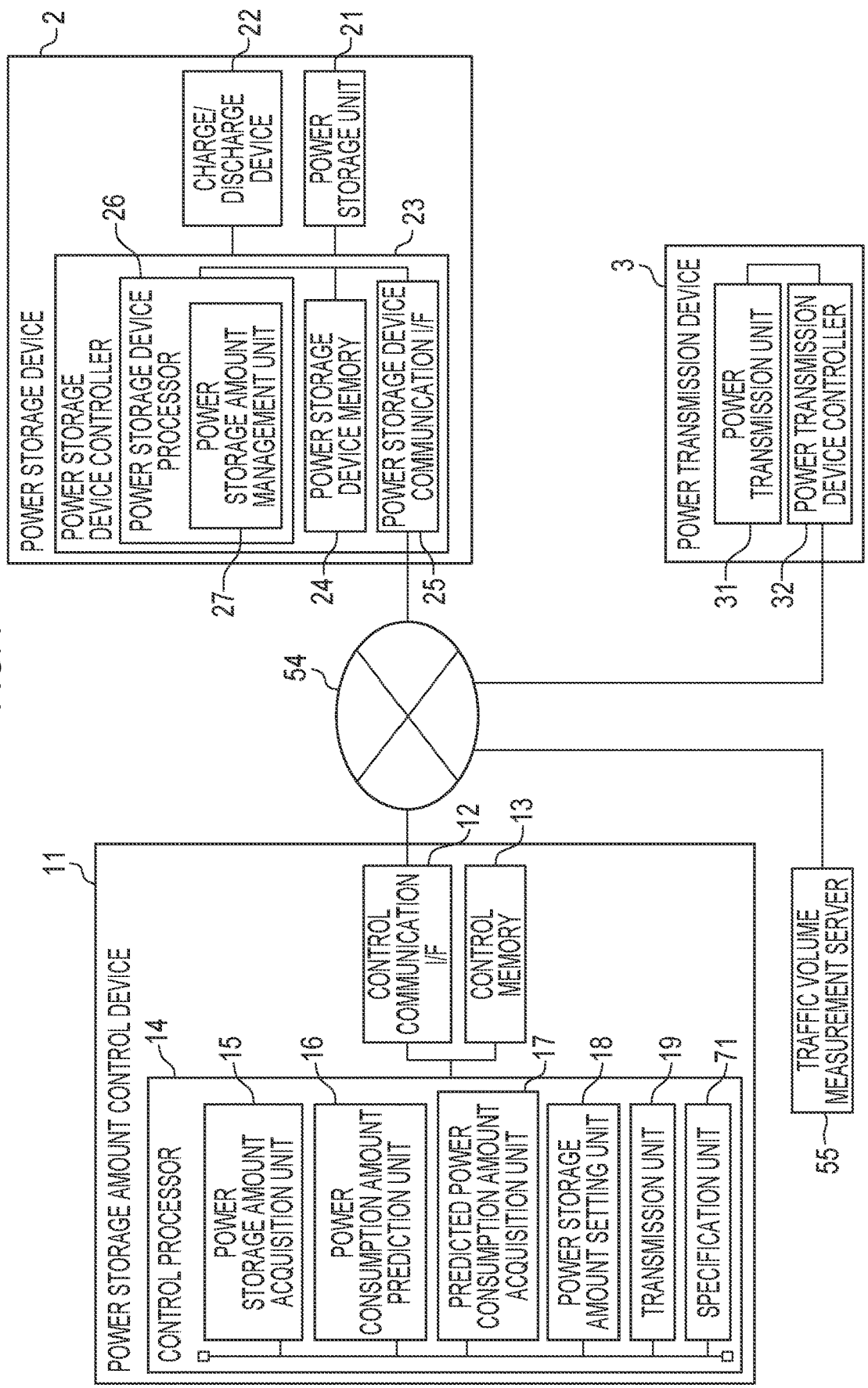
FIG. 7 is a block diagram showing each element in the non-contact power supply system of the third embodiment.

FIG. 7 is a block diagram showing each element in the non-contact power supply system 1 of the present embodiment. As described above, the control processor 14 of the power storage amount control device 11 further includes the specification unit 71. The specification unit 71 specifies the shortage power storage device and the excess power storage device based on the current power storage amount of each power storage device 2 acquired by the power storage amount acquisition unit 15 and the target power storage amount of each power storage device 2 set by the power storage amount setting unit 18. Here, the excess power storage device and the shortage power storage device in the present embodiment are examples of "at least one of power storage devices" and "one or more other power storage device", respectively.

An operation of the power storage amount control device 11 in the non-contact power supply system 1 of the present embodiment will be described in detail with reference to a flowchart of FIG. 8.

FIG. 8 is a flowchart showing a flow of the power storage amount control processing in the non-contact power supply system 1 of the present embodiment. Since steps S100 to S103 of FIG. 8 have the same flow as the flows of the first and second embodiments, the description thereof will be omitted and a description will be given from step S304.

When the power storage amount of each power storage device 2 is acquired in step S103, the control processor 14 determines whether or not there is a shortage power storage device with the power storage amount less than the target power storage amount (step S304). The specification unit 71 specifically specifies the shortage power storage device with the power storage amount that is less than the target power storage amount based on the current power storage amount of each power storage device 2 acquired by the power storage amount acquisition unit 15 and the target power storage amount set by the power storage amount setting unit 18.

When the shortage power storage device is determined to be present (Yes in step S304), the control processor 14 determines whether or not there is an excess power storage device with the power storage amount that is equal to or larger than the target power storage amount (step S305). The specification unit 71 specifically specifies the excess power storage device with the power storage amount that is equal to or larger than the target power storage amount based on the current power storage amount of each power storage device 2 acquired by the power storage amount acquisition unit 15 and the target power storage amount set by the power storage amount setting unit 18.

When the specification unit 71 determines that the excess power storage device is present (Yes in step S305), the transmission unit 19 issues an instruction to supply the power from the excess power storage device to the shortage power storage device (step S306). The transmission unit 19 specifically transmits the control signal to the excess power storage device to control the charge/discharge device 22 of the excess power storage device such that the power of the excess power storage device is directly supplied to the shortage power storage device via the second power line 57 without via the system power source 52. In addition, the transmission unit 19 transmits the control signal to the shortage power storage device to control the charge/discharge device 22 to receive the power from the excess power storage device via the second power line 57.

When the power storage amount control processing is executed, the power is directly supplied from the excess power storage device to the shortage power storage device via the second power line 57. In this case, since the power stored in the excess power storage device is direct-current power, the power is supplied without performing the power conversion by the charge/discharge device 22.

Thus, in the present embodiment, since the power is supplied to the power storage device with the power storage amount that is less than the target power storage amount without via the system power source 52, there is no loss due to the power conversion and thus the power can be efficiently supplied, as compared with the case where the power is supplied from the system power source 52 to the power storage device with the power storage amount that is less than the target power storage amount.

Modification Example of Third Embodiment

Next, a modification example of the third embodiment of the present disclosure will be described. In the non-contact power supply system 1 according to the modification example of the third embodiment, a basic configuration is the same as that of the third embodiment. In the present modification example, when the power storage amount of the power storage device 2 is larger than the target power storage amount, a surplus amount by exceeding the target power storage amount, of the power of the power storage device 2 is supplied to the system power source.

The transmission unit 19 of the power storage amount control device 11 specifically transmits, to the power storage device specified as the excess power storage device by the specification unit 71, the control signal for supplying the surplus power storage amount by exceeding the target power storage amount, of the power storage device to the system power source 52. The power storage amount management unit 27 of the excess power storage device that has received such a control signal causes the charge/discharge device 22 to adjust a voltage or the like such that the surplus power stored in the power storage unit 21 can be supplied to the system power source 52 and turns on the switch that turns on/off the connection with the system power source 52.

Thus, according to the modification example of the third embodiment, with the supply of the power stored in the excess power storage device with the power storage amount that is equal to or more than the target power storage amount to the system power source 52, it is possible to effectively use the power that may not be used. The supply of the power of the excess power storage device to the system power source 52 in the present modification example can be used in combination with the direct supply of the power of the excess power storage device to the shortage power storage device in the third embodiment. Therefore, the power of the excess power storage device can be directly supplied to the shortage power storage device via the second power line or can be indirectly supplied to the shortage power storage device via the system power source 52.

Other Modification Examples

In the embodiments, the predicted power consumption amount of each power transmission device 3 calculated based on the predicted traffic volume is used as the parameter representing the predicted power consumption amount. However, another parameter may be used as the parameter representing the predicted power consumption amount. Specifically, for example, the predicted traffic volume or the current traffic volume on the road on which the power transmission device is installed or a current power consumption amount may be used as the parameter representing the predicted power consumption amount. Further, a past power transmission amount from the power transmission device 3 to the electrified vehicle 4 may be used as the parameter representing the predicted power consumption amount. In this case, a power transmission amount history is transmitted from the power transmission device controller 32 of the power transmission device 3 to the power storage amount control device 11, and the power consumption amount prediction unit 16 predicts the power consumption amount using the parameter. Further, the power consumption amount prediction unit 16 that calculates the predicted power consumption amount based on the predicted traffic volume may be provided outside the power storage amount control device 11.

In the embodiments, the power storage amount management unit 27 is provided inside the power storage device 2, but may be provided inside the power transmission device 3 or outside the power storage device 2 and the power transmission device 3.

Further, in each embodiment, the power storage amount setting unit 18 of the power storage amount control device 11 determines whether the power storage amount of each power storage device 2 is less than the target power storage amount and transmits the control signal to the power storage device 2 based on the determination result. However, the power storage amount management unit 27 of each power storage device 2 may determine whether or not the power storage amount of the power storage device 2 is less than the target power storage amount and transmit the control signal to the charge/discharge device 22 based on the determination result. In this case, the power storage amount control device 11 transmits, to each power storage device 2, solely the signal related to the target power storage amount.

In addition, in the embodiments, a load that consumes the power is a power transmission device in a non-contact power supply system while traveling. However, the load that consumes the power may be a power transmission device in a power supply system while stopped (power transmission device in power supply stand). Therefore, the present disclosure can also be applied to a power supply system while stopped. Further, the load that consumes the power is not limited to the power supply system and may be, for example, a household electric appliance.

(1) A power storage amount control device according to a first aspect of the present disclosure is configured to control a power storage amount of each of a plurality of power storage devices. Each of the power storage devices is configured to store power from a system power source and to supply the stored power to a corresponding load. The power storage amount control device includes a processor configured to: acquire a value of a parameter representing a predicted power consumption amount of the load; set a target power storage amount of each of the power storage devices based on the value of the parameter representing the predicted power consumption amount; transmit signals to the power storage devices such that the power storage amount of each of the power storage devices is equal to or larger than the set target power storage amount; and set the target power storage amount of a first power storage device that supplies the power to a first load higher than the target power storage amount of a second power storage device that supplies the power to a second load of which the predicted power consumption amount represented by the parameter that is smaller than the predicted power consumption amount of the first load, the first power storage device and the second power storage device being included in the power storage devices.

(2) In the first aspect of the present disclosure, the processor may be configured to: acquire magnitude of surplus power supplied in excess of a power consumption amount of a power supply jurisdiction area in which each of the power storage devices is installed; and transmit, when the magnitude of the surplus power is equal to or less than a predetermined value, a control signal to each of the power storage devices such that the power storage is not performed on each of the power storage devices even when the power storage amount of each of the power storage devices is smaller than the target power storage amount.

(3) In the first aspect of the present disclosure, the processor may be configured to, when a power storage amount of at least one of the power storage devices is larger than the target power storage amount, transmit, to the at least one of the power storage devices, a control signal for directly supplying power of the at least one of the power storage devices to one or more other power storage devices each having a power storage amount that is smaller than the target power storage amount without via the system power source.

(4) In the first aspect of the present disclosure, the processor may be configured to transmit, to a power storage device, among the power storage devices, having a power storage amount that is larger than the target power storage amount, a control signal for supplying a surplus power storage amount by exceeding the target power storage amount, of the power storage device to the system power source.

(5) In the first aspect of the present disclosure, the load may be a power transmission device configured to perform non-contact power supply to an electrified vehicle.

(6) in the first aspect of the present disclosure, the parameter representing the predicted power consumption amount may include a traffic volume of a road on which the power transmission device is installed.

(7) in the first aspect of the present disclosure, the parameter representing the predicted power consumption amount may include a past power transmission amount from the power transmission device to the electrified vehicle.

(8) A power storage amount control method according to a second aspect of the present disclosure is a method for controlling a power storage amount of each of a plurality of power storage devices. Each of the power storage devices being configured to store power from a system power source and to supply the stored power to a corresponding load. The power storage amount control method includes: acquiring a value of a parameter representing a predicted power consumption amount of the load; setting a target power storage amount of each of the power storage devices such that the target power storage amount of a first power storage device that supplies the power to a first load higher than the target power storage amount of a second power storage device that supplies the power to a second load of which the predicted power consumption amount represented by the parameter that is smaller than the predicted power consumption amount of the first load, the first power storage device and the second power storage device being included in the power storage devices; and transmitting signals to the power storage devices such that the power storage amount of each of the power storage devices is equal to or larger than the target power storage amount.

Although the preferred embodiments of the present disclosure have been described, the present disclosure is not limited to the embodiments, and various changes and modifications can be blade within the scope of the claims.

What is claimed is:

1. A power storage amount control device configured to control a power storage amount of each of a plurality of power storage devices, each of the power storage devices being configured to store power from a system power source and to supply the stored power to a corresponding load, the power storage amount control device comprising a processor configured to:
   acquire a value of a parameter representing a predicted power consumption amount of the load;
   set a target power storage amount of each of the power storage devices based on the value of the parameter representing the predicted power consumption amount;
   transmit signals to the power storage devices such that the power storage amount of each of the power storage devices is equal to or larger than the set target power storage amount;
   set the target power storage amount of a first power storage device that supplies the power to a first load higher than the target power storage amount of a second power storage device that supplies the power to a second load of which the predicted power consumption amount represented by the parameter that is smaller than the predicted power consumption amount of the first load, the first power storage device and the second power storage device being included in the power storage devices,
   acquire magnitude of surplus power supplied in excess of a power consumption amount in a power supply jurisdiction area in which each of the power storage devices is installed, and
   transmit, when the magnitude of the surplus power is equal to or less than a predetermined value, a control signal to each of the power storage devices such that the power storage is not performed on each of the power storage devices even when the power storage amount of each of the power storage devices is smaller than the target power storage amount.

2. The power storage amount control device according to claim 1, wherein the processor is configured to, when a power storage amount of at least one of the power storage devices is larger than the target power storage amount, transmit, to the at least one of the power storage devices, a control signal for directly supplying power of the at least one of the power storage devices to one or more other power storage devices each having a power storage amount that is smaller than the target power storage amount without via the system power source.

3. The power storage amount control device according to claim 1, wherein the processor is configured to transmit, to a power storage device, among the power storage devices, having a power storage amount that is larger than the target power storage amount, a control signal for supplying a surplus power storage amount by exceeding the target power storage amount, of the power storage device to the system power source.

4. The power storage amount control device according to claim 1, wherein the load is a power transmission device configured to perform non-contact power supply to an electrified vehicle.

5. The power storage amount control device according to claim 4, wherein the parameter representing the predicted power consumption amount includes a traffic volume of a road on which the power transmission device is installed.

6. The power storage amount control device according to claim 4, wherein the parameter representing the predicted power consumption amount includes a past power transmission amount from the power transmission device to the electrified vehicle.

7. A power storage amount control method for controlling a power storage amount of each of a plurality of power storage devices, each of the power storage devices being configured to store power from a system power source and to supply the stored power to a corresponding load, the power storage amount control method comprising:

acquiring a value of a parameter representing a predicted power consumption amount of the load;

setting a target power storage amount of each of the power storage devices such that the target power storage amount of a first power storage device that supplies the power to a first load higher than the target power storage amount of a second power storage device that supplies the power to a second load of which the predicted power consumption amount represented by the parameter that is smaller than the predicted power consumption amount of the first load, the first power storage device and the second power storage device being included in the power storage devices;

transmitting signals to the power storage devices such that the power storage amount of each of the power storage devices is equal to or larger than the target power storage amount, acquiring magnitude of surplus power supplied in excess of a power consumption amount in a power supply jurisdiction area in which each of the power storage devices is installed, and transmitting, when the magnitude of the surplus power is equal to or less than a predetermined value, a control signal to each of the power storage devices such that the power storage is not performed on each of the power storage devices even when the power storage amount of each of the power storage devices is smaller than the target power storage amount.

* * * * *